United States Patent [19]
Kelley et al.

[11] 3,720,884
[45] March 13, 1973

[54] METHOD AND APPARATUS FOR COMPRESSION OF OPTICAL LASER PULSES

[75] Inventors: Paul L. Kelley, Waban, Mass.; Robert Alan Fisher, Berkeley; T. Kenneth Gustafson, Oakland, both of Calif.

[73] Assignee: Massachusetts Institute of Technology, Cambridge, Mass.

[22] Filed: March 23, 1970

[21] Appl. No.: 21,648

[52] U.S. Cl. ..................................................331/94.5
[51] Int. Cl. .................................................H01s 3/02
[58] Field of Search ......331/94.5; 350/160; 332/7.51

[56] References Cited

UNITED STATES PATENTS 3,551,034  12/1970  Tournois et al..............331/94.5 UX

OTHER PUBLICATIONS

Giordmaine, J. A. et al., "Compression of Optical Pulses," IEEE Journal of Quantum Electronics, Vol. QE–4 No. 5, May, 1968, pp. 253–255.

Primary Examiner—William L. Sikes
Attorney—Martin M. Santa, Robert Shaw and Arthur A. Smith, Jr.

[57] ABSTRACT

Short optical radiation pulses (picosecond range) passed through an optical Kerr liquid receive a self-phase-modulation which exhibits a frequency sweep in the region of maximum intensity, the slope in time being proportional to the propagation distance. The phase-modulated pulse from the Kerr cell is directed to a dispersive delay line which delays the higher optical frequencies the least thereby compressing the pulse width. Frequency spreads of the order of $10^3$ cm$^{-1}$ are obtainable and hence significant compression ratios are possible, giving rise to very short pulses in the range of $10^{-14}$ to $10^{-13}$ sec.

11 Claims, 4 Drawing Figures

PATENTED MAR 13 1973    3,720,884

INVENTORS,
PAUL L. KELLEY
ROBERT ALAN FISHER
T. KENNETH GUSTAFSON

BY *Robert T Dunn*

ATTORNEY

METHOD AND APPARATUS FOR COMPRESSION OF OPTICAL LASER PULSES

The present invention relates to optical lasers and more particularly to methods and apparatus for compressing pulses from optical lasers.

It has been proposed to compress an optical pulse envelope by techniques analogous to those used at microwave frequencies. The pulse is frequency swept in time and the resultant "chirped" pulse is then compressed by passing it through a system which acts as a dispersive delay line. Such a compression has been accomplished by employing extracavity rf modulation as the "chirper" and an interferometer as the compressor. It has also been reported that mode-locked neodymium-glass laser pulses have been chirped by an as yet unexplained mechanism occurring in the laser cavity and can be compressed close to the bandwidth limit ($3 \times 10^{-13}$ sec) by using a "grating pair." The grating pair is a dispersive delay line, one which introduces between two Fourier components a delay proportional to the frequency difference, the higher frequency components being delayed the least.

In the present invention, even shorter pulses are possible by employing the large positive chirp (positive time rate of change of the frequency) obtainable near the center of a short pulse as a result of self-phase-modulation. This modulation is produced by passing the pulse through a medium which shows a large intensity dependence of the refractive index. When the relaxation time of the nonlinearity is much less than the pulse duration, the region where the positive chirp is largest and least dependent on time occurs at the peak of the pulse and large compression ratios are possible. For longer relaxation times, this region is delayed with respect to the peak of the pulse. Consequently, the chirp cannot be used as efficiently for compression.

It is an object of the present invention to provide a method and apparatus for compressing optical pulses.

It is another object to provide method and apparatus for compressing optical pulses to increase the peak intensity of radiation of the pulse.

It is another object to provide method and apparatus for reducing the duration of optical pulses from a laser.

It is a further object to provide optical pulses of duration on the order of $10^{-14}$ to $10^{-13}$ seconds.

Other objects and features of the present invention will be apparent from the following specific description of the process and apparatus for compressing optical pulses and examples of the best known uses of the process and apparatus which are described herein with reference to the figures in which.

Some optically transparent materials such as liquid $CS_2$ exhibit a large optical Kerr effect and reasonably short relaxation time. Provided saturation effects are neglected, the index of refraction has the approximate form, $n = n_o + \delta n$ where $$\tau (\delta \delta n/\delta t) = -(\delta n - n_2 E^2) \quad (1)$$

Here $\tau$ is the relaxation time, which is 2 psec for $CS_2$, $E$ is the value of the electric field of the pulse and $n_2$ is the nonlinear coefficient of the material. An optical pulse travelling through such a medium is distorted both in envelope shape (self-steepening) and in phase (self-phase-modulation). Envelope distortion, moreover, can be negligible while self-phase-modulation produces, in self-trapped filaments, spectral broadening several hundreds of wavenumbers in extent.

Figure 1:
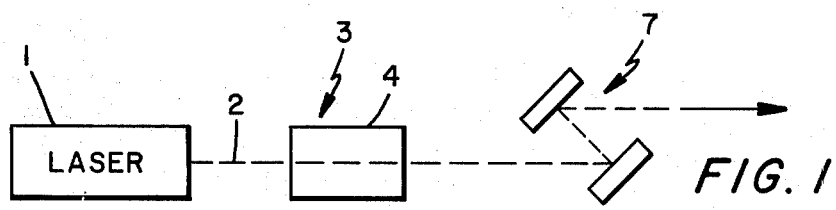
FIG. 1 illustrates apparatus including a pulsed optical laser for compressing pulses of radiation from the laser using a grating pair as the dispersive optical delay line.

In FIG. 1, the laser 1 produces initially unmodulated pulses of radiation 2 which are directed to the Kerr cell 3 which is liquid $CS_2$ in a transparent container 4. The laser is, for example, a Neodymium laser producing 5 picosecond pulses substantially monochromatic optical radiation at 1.06 $\mu$. The peak intensity of the pulses is about 22 GW/cm².

Figure 3:
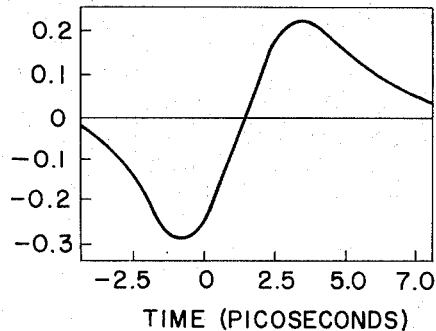
FIG. 3 is a plot of the time derivative of the phase perturbation across a given optical pulse after propagating 10 cm in $CS_2$ liquid.

A chirp is produced on a laser pulse when it passes through the Kerr cell 3. The chirp is a spreading of the frequency band of the unmodulated pulse from the laser brought about by the non-linear (self-phase-modulation) effect of the Kerr cell. FIG. 3 illustrates the chirp effect on the laser pulse. It is a plot of the time derivative of the phase perturbation across the pulse. The normalization factor $$\beta_o T_p' = 3.77 \times 10^{14} \, \text{sec}^{-1}$$

for a 10 centimeter propagation distance in the $CS_2$ Kerr cell. The relaxation time for $CS_2$ is 2 picoseconds and hence the crossover point of the plot is at 2 picoseconds. If the relaxation time were zero, then the crossover would be at zero time and the time derivative of maximum and minimum values would be at $+0.43$ and $-0.43$, respectively.

An investigation of the chirp arising from the Kerr effect, first considers the phase perturbation resulting from the propagation of the initially unmodulated pulse through such a liquid. To avoid unnecessary theoretical complication, this neglects envelope distortion and assumes that the pulse travels a distance which is much less than the self-focusing distance. Self-focusing will have the effect of decreasing the length of cell necessary to obtain substantial self-phase-modulation, unless it induces other processes, such as the stimulated Raman effect, which might interfere with phase modulation. There are situations in self-trapped beams where substantial self-phase-modulation occurs without the Raman effect being significant. The electric field can be written as $$E(z,t) = \tfrac{1}{2} A(t - z/v_a) \exp[\omega_o t - K_o Z - \delta\phi] + CC \quad (2)$$

where $\omega_o$ is the laser frequency, $k_o = \omega_o n_o / c$ and $\delta\phi$ is the phase perturbation, $vg$ is the linear group velocity of the medium, and $A$ is the constant shape function equal to $A_o \exp[2(T_p')^{-2}(t-z/v_a)^2]$ for a Gaussian pulse, $T_p'$ being the $1/e$ intensity half-width which is approximately 0.6 times $T_p$, the full intensity width at ½ maximum.

If we substitute (2) into (1) and integrate, the index change is obtained $$\delta n = \frac{n_2}{\tau} \int_{-\infty}^{t-z/vg} \frac{A^2(t')}{z} \exp\left\{\left[t' - \left(t - \frac{z}{vg}\right)\right]/\tau\right\} dt' \quad (3)$$

The phase perturbation after propagating through a cell of length $l$ is given by $$\delta\phi = k_o(\delta n/n_o)l \quad (4)$$

To a good approximation, the frequency shift at any point on the pulse is given by the negative of the time derivative of $\delta\phi$, and the chirp $\beta$, is given by differentiating once again with respect to time.

For a relaxation time short compared to the pulse width, Eqs. (3) and (4) show that the phase perturbation closely approximates the shape of the intensity profile. A symmetrical pulse thus develops an approximately constant positive chirp $\beta_o$ near the intensity peak and the pulse envelope can be compressed by matching this chirp to the inverse of the delay per unit frequency of a delay line linearly dispersive in frequency. Since the effective bandwidth of the chirped pulse is of the order $\beta_o T_p/2$, the minimum compressed pulse envelope width $T_c$ obtainable is of the order of $2/(\beta_o T_p)$, the inverse bandwidth. In the limiting case of a zero or negligible relaxation time $\beta_o$, is approximately $8k_o\delta n_{max}/T_p{}^2_o$ from Eq. (5) where $n_{max}$ is the maximum index change. Therefore $$T_c \approx n_o T_p/4k_o l\delta n_{max} \approx n_o T_p/2k_o l n_2 A_o{}^2 \quad (5)$$

where $A_o$ is the maximum field amplitude. By definition $T_p > T_c$ and so from equation (5) it follows that:

$$\delta n_{max} > c/4\omega_o l$$

Figure 2:
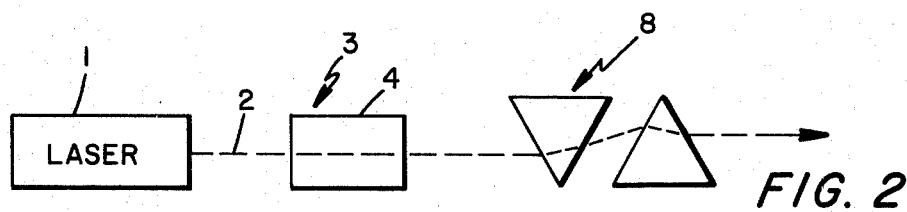
FIG. 2 illustrates similar apparatus using a pair of optical prisms as the dispersive delay line.

The self-phase-modulated pulses 6 from the Kerr cell are directed to a dispersive delay line which may be a pair of gratings 7 as shown in FIG. 1, a pair of prisms 8 as shown in FIG. 2, or a Fabry-Perot interferometer. Any of these structures act as a dispersive delay line having a delay per unit frequency which is linearly dispersive. The length of the Kerr cell is tailored so that the chirp is matched to the inverse of the delay per unit frequency.

In the limit of $T_p$ much shorter than the relaxation time $\tau$, Eq. (5) shows that the phase perturbation becomes monotonically increasing across the pulse since $\delta n$ is then proportional to the time-integrated intensity. The chirp is thus nonzero only on the wings of the pulse. Were such a pulse passed through the delay line the most intense portion would remain uncompressed.

To obtain the compressed pulse profiles and compression ratios including the influence of relaxation, Eq. (3) is integrated numerically to obtain the phase perturbation for a Gaussian intensity profile. The approximate instantaneous frequency shift, $\Omega = -\delta\delta\phi/\delta t$, as a function of time is shown in FIG. 3 for a 5-psec pulse of 22-GW/cm² peak intensity after propagating 10 cm in $CS_2$. The maximum index change is of the order of 1.5 down from the case of instantaneous relaxation.

The slowly varying part of the compressed field, $\epsilon c$ $(t-z/c)$ is given in terms of the initial field, $A(t-z/c)$, by the expression $$\epsilon c(t-z/c) = \frac{1}{2\pi}\int_{-\infty}^{+\infty} d\Omega \exp\{i[-(t-z/c)\Omega - \Omega^2/2\mu]\}$$

$$\times \int_{-\infty}^{+\infty} dt' A(t') \exp\{+i[\Omega t' + \delta\varphi(t')]\} \quad (6)$$

$\Omega^2/z\mu$ is the additional phase contributed to the Fourier component at frequency $\omega_0 + \Omega$ by the linearly dispersive delay line.

Figure 4:
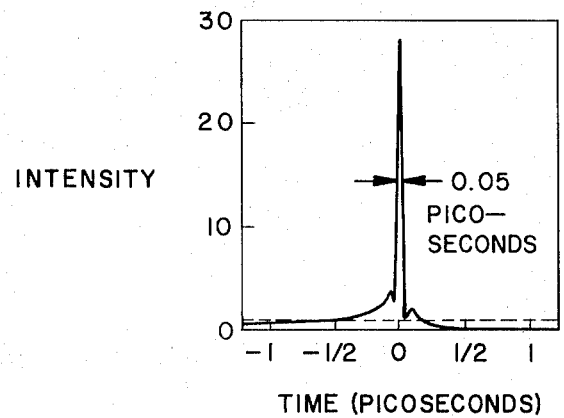
FIG. 4 is a plot showing the intensity profile of the optimally compressed optical pulse corresponding to the phase perturbation shown in FIG. 3.

The resultant pulse envelope is shown in FIG. 4. The optimum value of $\mu^{-1}$ is numerically found to be $1.3 \times 10^{-26}$ sec² for this particular case. The optimization point is found by increasing $\mu^{-1}$, which is proportional to the compressor setting, until the shortest pulse is found without substantial side lobes. These side lobes increase with further increase with further increase in $\mu^{-1}$ beyond the optimum value. For a dispersive delay line such as 7 made of two parallel gratings having 300 lines per mm and oriented so that the angle of incidence is 60°, the grating separation to give the optimum value of $\mu^{-1}$ is 4.0 cm.

The full width at half-intensity of the optimally compressed pulse $T_c$ is $5 \times 10^{-14}$ sec[16] and the peak intensity is 620 GW/cm². The optimum value of $\mu^{-1}$ corresponds to the slope of the frequency shift at a point between the peak of the pulse and the point of maximum slope (and constancy of slope). Thus the maximum compressed pulse originates primarily from a region which simultaneously optimizes the intensity and constancy of slope. The relatively large compressed pulse width confirms the adverse influence of relaxation upon the effective chirp. Compression ratios of the order of 100 can be Obtained with the structures described herein.

Thus, the dispersive delay line is matched to the chirped laser pulse. Substantial compression is obtained even when the match is not optimum. The optimum match occurs when the dispersion $\mu$ which is the change in phase per unit frequency difference of the components of the chirped pulse is equal to the rate of change of frequency $d\Omega/dt$ at a point along the chirped pulse, the point being an optimum point separated from the point of peak intensity of the pulse by no more than the relaxation time of the Kerr cell medium.

The effect of the Kerr cell is to cause the nearly monochromatic laser pulse to convert to a band centered at $\omega_o$. Thus, the monochromatic pulse whose pulse length can be no less than the limit established by the Heizenberg indeterminacy principle, is subjected to self-phase-modulation by the Kerr cell to increase the bandwidth of the pulse in a predetermined manner. The width of the pulse can then be shortened many orders of magnitude without violating the principle. The pulse width is shortened (compressed) by the action of the dispersive delay line that delays as a linear function of frequency. Thus, a broader band, but much shorter pulse of much greater peak power than the original unmodulated pulse from the laser is produced.

Although the embodiments herein have been carried out specifically for Neodymium pulses, intense mode-locked ruby pulses should serve equally well.

It is possible that the inherent chirping of the pulses within the cavity of the neodymium laser can also be at least partially attributed to the self-phase-modulation process. This would arise from the Kerr effect in the dye-solvent of the mode-locking cell, usually chlorobenzene. It is estimated that for a 5-psec pulse having a peak power of the order of 40 GW/cm² a value of $\mu^{-1}$ corresponding to 100 A/4.5 psec gives a compression ratio of 5 for a propagation distance of the order of 1 cm in a chlorobenzene cell. A nonsymmetrical inhomogeneous gain profile and off-resonant excitation of the dye can also contribute, making a meaningful analysis difficult without more detailed information.

The embodiments of the present invention described herein are the best known uses of the invention to achieve the objects. Other Kerr cell materials could be used in place of the $CS_2$. For example, Chloroform, Acetone or Nitrobenzene could be used. All of these have longer relaxation times than $CS_2$ and so the optical pulse duration would preferably be greater than described herein with $CS_2$ in order to achieve comparable results.

Compression produced with the two parallel gratings, the pair of prisms or a Fabrey-Perot interferometer could also be produced, but perhaps less effectively, with a dispersive medium such as soda glass or lead glass.

What is claimed is:

1. In a pulsed laser system, means for compressing the pulses of frequency, $\omega_o/2\pi$, and width $T_p$ issuing from a laser cavity comprising, a medium of length $l$ through which the pulses of laser radiation propagate, the relaxation time $\tau$ of said medium being shorter than $T_p$ and the maximum change of refractive index of said material $\delta_{max}$ due to the intensity of the radiation being greater than $c/4\omega_o l$, where $c$ is the velocity of light, whereby the refractive index of said medium at the laser frequency is substantially dependent on the intensity of the radiation, resulting in a substantial phase perturbation across each pulse, and dispersive delay means through which the pulses having the substantial phase perturbation propagate causing a compression of each of the pulses.

2. In a pulsed laser system as in claim 1 and in which, the medium exhibits a substantial optical Kerr effect and a very short relaxation time relative to the laser pulse duration.

3. In a pulsed laser system as in claim 2 and in which, the ratio of $T_p$ to $\tau$ is at least 2:1.

4. In a pulsed laser system as in claim 2 and in which, laser issuing pulses from the laser cavity in the system are initially unmodulated and nearly monochromatic and the nonlinear Kerr effect causes self-phase-modulation of the pulses so that the time derivative of the phase perturbation across a pulse changes abruptly in sign across the pulse, and the dispersive delay means delays different frequency components of the pulses from the medium differently in correspondence with the change of the time derivative of the phase perturbation across a pulse between the peak of the pulse and the point of maximum slope of the time derivative.

5. In a pulsed laser system as in claim 1 wherein, the medium is $CS_2$.

6. In a pulsed laser system as in claim 1 wherein, the medium is Chloroform.

7. In a pulsed laser system as in claim 1 wherein, the medium is Acetone.

8. In a pulsed laser system as in claim 1 wherein, the medium is Nitrobenzene.

9. In a pulsed laser system as in claim 1 wherein, the dispersive delay means is a Fabrey-Perot interferomater.

10. In a pulsed laser system as in claim 1 wherein, the dispersive delay means is a pair of prisms.

11. In a pulsed laser system as in claim 4 wherein, the medium is $CS_2$ $2\pi c/\omega_q$ is about 1.06 micrometers
   $T_p$ is about 5 picoseconds and
   the pulse peak intensity and $l$ are selected to produce the substantial phase perturbation across each pulse.

* * * * *